Sept. 10, 1935.　　　　R. O. HUTCHENS　　　　2,013,962
COUPLING FOR SUCKER RODS
Filed March 4, 1935
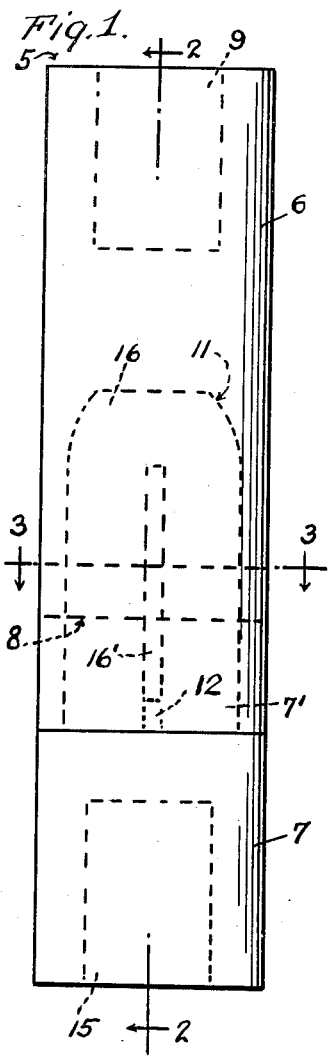
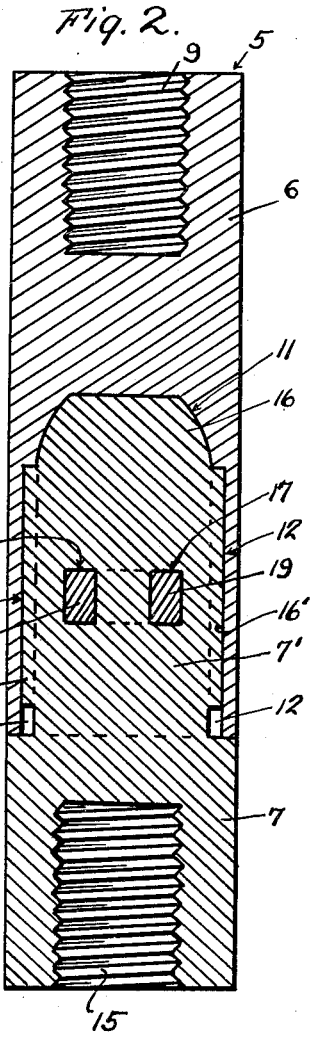
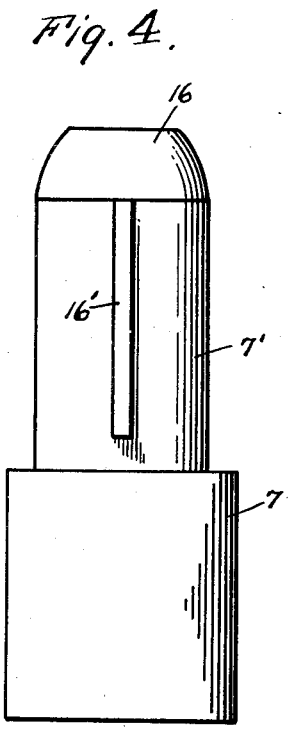
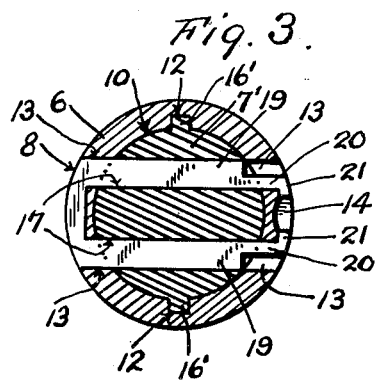
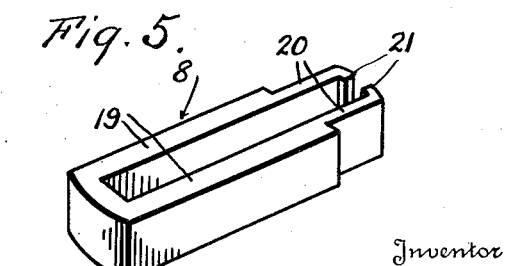
Inventor
R. O. Hutchens
By L. B. James
Attorney Patented Sept. 10, 1935

2,013,962

UNITED STATES PATENT OFFICE 2,013,962

COUPLING FOR SUCKER RODS

Ralph O. Hutchens, Long Beach, Calif.

Application March 4, 1935, Serial No. 9,303

1 Claim. (Cl. 287—119)

This invention relates to sucker rods for wells and more particularly a coupling therefor.

One of the objects of this invention resides in the provision of a coupling for sucker rods of wells adapted to connect sections of the sucker rods together so as to obviate the necessity of withdrawing the sucker rods from the wells for repairing or replacing the couplings thereof.

Another object of this invention resides in the provision of a coupling for sucker rods of wells adapted to be locked together without the use of bolts or the like.

A further object of this invention resides in the provision of a sucker rod coupling of such construction that it can be uncoupled without damaging the same.

With these and other objects in view this invention resides in certain novel features of construction to be hereinafter set forth in the specification, illustrated in the accompanying drawing and pointed out in the appended claim and, while the disclosure depicts my present conception of this invention, the right is reserved to resort to such changes in construction and arrangement as come within the scope of the claim.

In the accompanying drawing forming a part of this application:

Fig. 1 is a side view of a sucker rod coupling constructed in accordance with this invention.

Fig. 2 is a vertical sectional view thereof approximately on line 2—2 of Fig. 1.

Fig. 3 is a horizontal sectional view approximately on line 3—3 of Fig. 1.

Fig. 4 is a side view of the male member of the coupling.

Fig. 5 is a detail perspective view of the locking pin.

In the present embodiment of this invention the numeral 5 designates, in general, a sucker rod coupling constructed in accordance with this invention and preferably consists of a male member 7, female member 6 and a locking pin 8.

The aforesaid female member 6 is preferably formed from a piece of metal having a bore 10 therein which merges at its inner end into a substantially conical shaped socket 11, and is provided with grooves 12 formed in the walls thereof. This female member 6 is provided at that end thereof opposite the aforesaid bore with a threaded socket 9 for accommodating the threaded end of the upper section of a sucker rod (not shown) and is further provided with spaced substantially horizontally disposed apertures 13, certain of which are in alignment.

Adapted to be seated in the bore 10 of the female member 6 is a pin 7' formed on the male member 7. Said pin is of slightly lesser diameter than the bore 10 and is provided with lugs 16' adapted to be seated in the grooves 12 of the female member and further provided with a head 16 substantially of a configuration similar to the socket 11 to permit it to readily seat in said socket upon assembling the male and female members. Preferably formed in the aforesaid pin 7' are spaced apertures 17 herein shown as of rectangular configuration but which can be formed in any other shape capable of performing a similar function. These apertures 17 are adapted to align with the aforesaid apertures 13 of the female member upon seating the pin 7' in the bore 10. Formed in that end of the male member opposite the head 16 is a threaded bore 15 adapted to receive the threaded portion of the lower section of a sucker rod (not shown).

To facilitate locking the assembled male and female sections together when the pin 7' has been completely seated in the bore 10, the locking pin 8 is preferably formed of substantially U shaped configuration having arms 19 adapted to pass through the apertures 13 and 17 of the male and female members respectively and, to prevent displacement of the locking pin 8, the arms 19 are reduced in thickness as at 20 and provided with opposed ears 21 at their extremities for engagement with a cut-in portion 14 of the female member. Thus it is apparent that, upon inserting the locking pin 8, the reduced portions 20 will yield until the ears 21 are free to lodge behind the cut-in portion 14 whereupon removal of the pin and thus disassembling of the coupling is attained only by spreading the reduced portions 20 sufficiently to pass through the apertures 13 and 17.

With this invention fully set forth it is apparent that a coupling for sucker rods is provided which reduces the cost and trouble of assembling and disassembling the sucker rods and, through the simplicity of the embodiment involved, the cost of manufacture will be reasonable.

Having thus described my invention what I claim and desire to protect by Letters Patent is:

A sucker rod coupling of the character set forth comprising telescopically connected members having aligned apertures therein, a substantially U-shaped pin passing through the apertures and having resilient extremities, and ears formed on the resilient extremities of the U-shaped pin for engagement with a portion of one of the telescopic members.

RALPH O. HUTCHENS.